(12) United States Patent
McCarthy-Howe et al.

(10) Patent No.: US 10,367,766 B2
(45) Date of Patent: Jul. 30, 2019

(54) INTERMEDIARY DEVICE FOR DATA MESSAGE NETWORK ROUTING

(71) Applicant: TEN DIGIT Communications LLC, Simsbury, CT (US)

(72) Inventors: Thomas Spencer McCarthy-Howe, West Barnstable, MA (US); Gary George Brandt, Simsbury, CT (US)

(73) Assignee: TEN DIGIT COMMUNICATIONS LLC, Simsbury, CT (US)

( * ) Notice: Subject to any disclaimer, the term of this patent is extended or adjusted under 35 U.S.C. 154(b) by 131 days.

(21) Appl. No.: 15/411,424

(22) Filed: Jan. 20, 2017

(65) Prior Publication Data

US 2018/0212909 A1    Jul. 26, 2018

(51) Int. Cl.
G06F 15/16 (2006.01)
H04L 12/58 (2006.01)
G06F 15/173 (2006.01)

(52) U.S. Cl.
CPC .............. *H04L 51/14* (2013.01); *H04L 51/38* (2013.01)

(58) Field of Classification Search
CPC . H04L 51/14; H04L 51/38; H04L 1/00; H04L 2201/00
USPC ........................................................ 709/207
See application file for complete search history.

(56) References Cited

U.S. PATENT DOCUMENTS

| | | | |
|---|---|---|---|
| 4,825,435 A | 4/1989 | Amundsen et al. | |
| 6,529,586 B1 * | 3/2003 | Elvins ................. | H04M 3/4938 379/88.13 |
| 6,775,358 B1 * | 8/2004 | Breitenbach ........ | H04M 3/4938 379/88.13 |
| 7,023,979 B1 * | 4/2006 | Wu ...................... | H04M 3/5233 379/265.11 |
| 7,076,051 B2 | 7/2006 | Brown et al. | |
| 7,092,509 B1 | 8/2006 | Mears et al. | |
| 7,610,347 B2 | 10/2009 | Petrovykh | |
| 8,463,304 B2 | 6/2013 | Lauer et al. | |
| 8,848,898 B2 | 9/2014 | Jay et al. | |

(Continued)

OTHER PUBLICATIONS

International Search Report and Written Opinion, dated May 15, 2018, issued in corresponding Int'l. Appln. No. PCT/US2018/014445.

(Continued)

*Primary Examiner* — Karen C Tang
(74) *Attorney, Agent, or Firm* — Foley & Lardner LLP; James De Vellis

(57) ABSTRACT

An intermediary device disposed in a contact center environment is provided. The intermediary device can receive a first data message. A lobby assignment mechanism can assign the first data message to a default lobby construct, and can obtain, from a contact center agent computing device, an indication of assignment of the first data message to a destination lobby construct that is different than the default lobby construct. The lobby assignment mechanism can link the first data message with the destination lobby construct based on a characteristic of the first data message. The intermediary device can receive a second data message, and can bypass the default lobby construct to assign the second data message to the destination lobby construct based on a characteristic of the second data message and the characteristic of the first data message.

20 Claims, 6 Drawing Sheets

(56) References Cited

U.S. PATENT DOCUMENTS

| | | | |
|---|---|---|---|
| 9,031,087 B2 | 5/2015 | Petrovykh | |
| 9,106,724 B1 | 8/2015 | Harris | |
| 9,247,062 B2 | 1/2016 | Fahlgren et al. | |
| 2002/0133392 A1* | 9/2002 | Angel | G06F 17/3089 705/7.39 |
| 2002/0138522 A1 | 9/2002 | Muralidhar et al. | |
| 2002/0141381 A1* | 10/2002 | Gawargy | H04L 29/06027 370/352 |
| 2004/0189710 A1 | 9/2004 | Goulden et al. | |
| 2005/0259806 A1* | 11/2005 | Chang | H04M 3/4931 379/218.01 |
| 2007/0041527 A1* | 2/2007 | Tuchman | G06Q 30/0207 379/88.22 |
| 2009/0193131 A1* | 7/2009 | Shi | H04L 65/1063 709/229 |
| 2010/0192207 A1 | 7/2010 | Raleigh | |
| 2010/0205017 A1* | 8/2010 | Sichelman | G06Q 10/02 705/5 |
| 2010/0241577 A1* | 9/2010 | Geppert | G06Q 10/10 705/304 |
| 2014/0006158 A1* | 1/2014 | Cooper | G06Q 30/02 705/14.56 |
| 2014/0064467 A1* | 3/2014 | Lawson | H04M 15/43 379/114.03 |
| 2014/0100932 A1 | 4/2014 | Goldfinger et al. | |
| 2014/0344261 A1* | 11/2014 | Navta | G06F 17/30864 707/723 |
| 2017/0195486 A1* | 7/2017 | Li | H04M 3/5166 |
| 2018/0097910 A1* | 4/2018 | D'Agostino | H04L 67/32 |

OTHER PUBLICATIONS

International Search Report and Written Opinion for PCT/US2017/014385 dated Apr. 7, 2017.

* cited by examiner

INTERMEDIARY DEVICE FOR DATA MESSAGE NETWORK ROUTING

BACKGROUND

Voice based communication between computing devices can be limited to one to one direct communication, with limited ability for many-to-one parallel or concurrent communication.

SUMMARY

At least one aspect is directed to an intermediary device to route data messages in a contact center environment. An intermediary device can be disposed in a data communication path between an electronic communications network and a client computing device. The intermediary device can include at least one of a lobby assignment mechanism, a session storage unit, a default lobby construct, and a destination lobby construct. The intermediary device can be disposed to receive, via the electronic communications network, a first data message. The first data message can include a characteristic. The lobby assignment mechanism can assign the first data message to the default lobby construct. The lobby assignment mechanism can obtain, from a contact center agent computing device, an indication of a transfer of the first data message to the destination lobby construct that is a different lobby construct than the default lobby construct. The indication of the transfer can identify the first data message. The lobby assignment mechanism can link, responsive to the indication of the transfer of the first data message to the destination lobby construct, the first data message with the destination lobby construct based on the characteristic of the first data message. The intermediary device can be disposed to receive, via the electronic communications network, a second data message having a characteristic. The lobby assignment mechanism can bypass the default lobby construct to assign the second data message to the destination lobby construct based on the characteristic of the second data message and the characteristic of the first data message.

At least one aspect is directed to a method of data message routing in a contact center environment. The method can provide an intermediary device to dispose in a data communication path between an electronic communications network and a client computing device. The intermediary device can include at least one of a lobby assignment mechanism, a session storage unit, a default lobby construct, and a destination lobby construct. The method can receive, by the intermediary device, via the electronic communications network, a first data message. The first data message can include a characteristic. The method can assign, by the lobby assignment mechanism, the first data message to the default lobby construct. The method can obtain, by the lobby assignment mechanism, from a contact center agent computing device, an indication of a transfer of the first data message to the destination lobby construct that is a different lobby construct than the default lobby construct. The indication of the transfer can identify the first data message. The method can link, by the lobby assignment mechanism, responsive to the indication of the transfer of the first data message to the destination lobby construct, the first data message with the destination lobby construct based on the characteristic of the first data message. The method can receive, by the intermediary device, via the electronic communications network, a second data message having a characteristic. The method can assign, by the lobby assignment mechanism, and bypassing the default lobby construct, the second data message to the destination lobby construct based on the characteristic of the second data message and the characteristic of the first data message.

At least one aspect is directed to a computer readable storage medium storing instructions that when executed by one or more data processors, cause the one or more data processors to perform operations to manage text based data messages. The operations can include providing an intermediary device to dispose in a data communication path between an electronic communications network and a client computing device. The intermediary device can include at least one of a lobby assignment mechanism, a session storage unit, a default lobby construct, and a destination lobby construct. The operations can receive, by the intermediary device, via the electronic communications network, a first data message. The first data message can include a characteristic. The operations can assign, by the lobby assignment mechanism, the first data message to the default lobby construct. The operations can obtain, by the lobby assignment mechanism, from a contact center agent computing device, an indication of a transfer of the first data message to the destination lobby construct that is a different lobby construct than the default lobby construct. The indication of the transfer can identify the first data message. The operations can link, by the lobby assignment mechanism, responsive to the indication of the transfer of the first data message to the destination lobby construct, the first data message with the destination lobby construct based on the characteristic of the first data message. The operations can receive, by the intermediary device, via the electronic communications network, a second data message having a characteristic. The operations can assign, by the lobby assignment mechanism, and bypassing the default lobby construct, the second data message to the destination lobby construct based on the characteristic of the second data message and the characteristic of the first data message.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
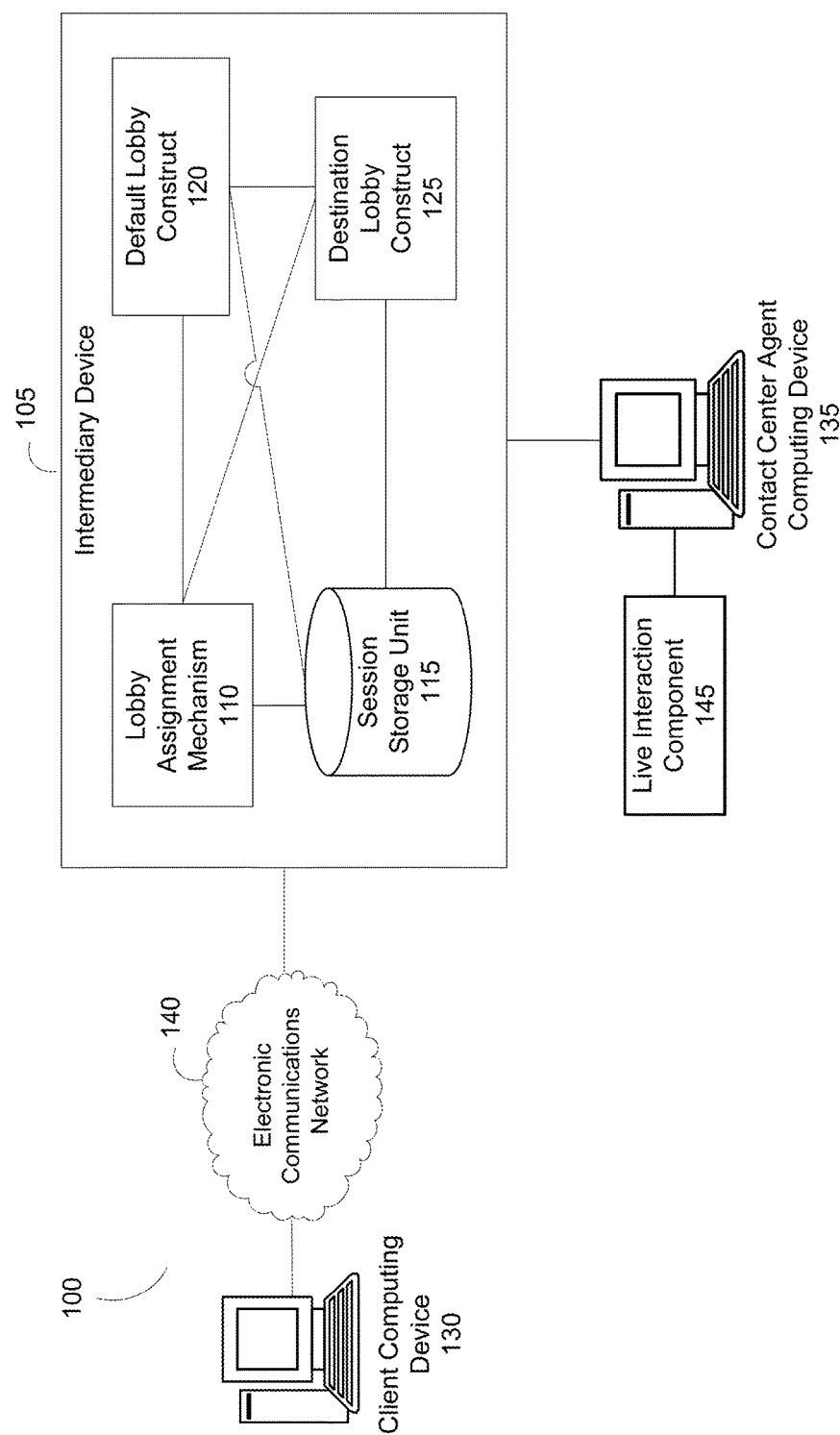
FIG. 1 is a block diagram of an example system that routes data messages.

Following below are more detailed descriptions of various concepts related to, and implementations of, methods, apparatuses, and systems of data message routing, enhancement, or management in a contact center environment. The various concepts introduced above and discussed in greater detail below may be implemented in any of numerous ways.

Systems and methods of the present disclosure relate generally to an intermediary device for data message routing or enhancement, including network based data packet transmission, and corresponding systems, methods, and apparatuses. Text or other network based data messages can replace synchronous voice based communications (such as a live telephone call) to, for example, a contact center agent in a contact center environment. Routing, assigning to the appropriate destination, aggregating, enhancing, merging or associating individual data messages is a technical problem for an intermediary device that can be part of a data processing system in a contact center environment. For example, multiple text or other protocol based data messages can be asynchronous or time shifted. These data messages might be not be overtly linked with one another, such as a first data message to a cable company contact center about a bill and a second data message the next day to the same contact center, from the same source, that is about a change in address. There may be a number of contact center agent computing devices equipped to receive these data messages. Routing data messages to the incorrect or inappropriate contact center agent computing device, where they may need to be re-routed, leads to unnecessary increased computer network transmissions, increased network traffic and latency, unnecessary increased computer processing usage and a corresponding waste of electrical power.

The intermediary device described herein provides a technical solution to the above and other technical problems by, for example, employing one or more lobby constructs and one or more lobby assignment mechanisms to route or assign data messages to the appropriate destination (e.g., a contact center agent computing device) equipped to process or respond to the data message. The intermediary device and other system components can assign inbound data messages to a default lobby construct. A contact center agent computing device can access the data messages in the default lobby construct and can determine that the default lobby construct is the correct or incorrect location for the data messages.

When the default lobby construct is the correct location for the data message, the intermediary device (or a component thereof such as the lobby assignment mechanism) can receive an indication (a data transmission) from a contact center agent computing device that a data message properly resides in the default lobby construct. Responsive to this indication, the lobby assignment mechanism can assign the data message to the lobby construct. The data message assigned to the lobby construct can have one or more characteristics, such as indications of source, destination, data message subject matter, end user identifiers or account identifiers. The intermediary device can receive a second inbound data message that also has characteristics. The intermediary device can compare characteristics of the first data message (assigned to the default lobby construct) and a second data message. Based on the comparison (e.g., a match, similarity, or correlation between at least some characteristics of the data messages), the intermediary device can assign the second data message to the same default lobby construct.

When the default lobby construct is the incorrect location for the (e.g., first) data message, the contact center agent computing device can determine that the default lobby construct is the incorrect location, and can transfer the data message to a second, different destination lobby construct. At the time of this transfer, the intermediary device need not have information indicating the existence of the destination lobby construct, and the intermediary device need not receive an indication of the transfer of the data message between lobby constructs. Once the data message is transferred to the destination lobby construct, the same or a different contact center agent computing device responsible for the transfer can indicate to the intermediary device that the destination lobby construct is the correct location for processing of the data message. Responsive to this indication the intermediary device or component thereof can assign the data message to the destination lobby construct. The intermediary device can receive a second inbound data message, and can compare characteristics of the first and second data messages. Based on the comparison the intermediary device can assign the second data message directly to the destination lobby construct, bypassing the default lobby construct in this example. This bypass results in reduced data transmissions, which saves bandwidth and reduces latency as the data messages are transferred more efficiently to the appropriate destination. Further the intermediary device is a scalable and modular system. For example, at startup the intermediary device need only be aware of the existence of a single lobby construct (e.g., the default lobby). The intermediary device can then rely on information obtained from contact center agent computing devices to identify one or more different destination lobby constructs. Thus, in a contact center environment with a node or tree-like structure to route data messages to final destinations, the intermediary device need not initially have an awareness of all (or any) destination lobby constructs. This prevents the need to re-program the intermediary device whenever there is a change to the tree structure, which increases system efficiency and reduced offline or downtime of a contact center environment that includes the intermediary device.

The system and method provided by the intermediary device of routing (e.g., second and subsequent) data messages to destinations (e.g., lobby constructs that can aggregate, store, or identify data messages that can include common characteristics) reduces the number of packet (or other protocol based) computer network transmissions that may otherwise occur due to inefficient routing to, for example, unnecessary transfers or hops to incorrect destinations (e.g., constructs accessible by the wrong contact center agent computing device) before arriving at the correct destination. This saves bandwidth, reduces latency, saves power, and results in faster communication between the end user computing device and the correct contact center agent computing device.

FIG. 1 illustrates an example system 100 to route text based data messages. The system 100 can include at least one intermediary device 105. The intermediary device 105 can include at least one lobby assignment mechanism 110, at least one session storage unit 115, at least one default lobby construct 120, and at least one destination lobby construct 125. The intermediary device 105 can be or include one or more data processing systems, servers, virtual servers, or computing devices. The intermediary device 105 can include hardware (e.g., processors of one or more servers), as well as scripts or programs executed by the hardware, and combinations thereof. The intermediary device 105 can reside (e.g., be physically or logically disposed) in an electronic communication path between at least one client computing device 130 and at least one contact center agent computing device 135. For example, the intermediary device 105 can communicate, (e.g., via a LAN, WAN, the internet, a cloud environment, or other computer network) with contact center agent computing devices 135 and with client computing devices 130. Data communication messages such as text messages or asynchronous voice messages (e.g., that are sent as a voicemail message and not part of a live conversation) can pass between an electronic communications network 140 and the contact center agent computing device 135, for example for display by the contact center agent computing device 135 or by the client computing device 130. The intermediary device 105 can enhance contact center operation by providing an operator of the contact center agent computing device 135 with the ability to live text with multiple client computing devices 130 during one time period, to effect continuous conversation with multiple end users during consecutive or intermittent time period that can range from seconds to days.

The intermediary device 105 can include the lobby assignment mechanism 110, the session storage unit 115, the default lobby construct 120, or the destination lobby construct 125 as part of one or more servers of a contact center system to assign, route, establish, modify, enhance or provide data messages between the client computing device 130 and the appropriate contact center agent computing device 135 from a plurality of candidate contact center agent computing devices 135. The data messages can be part of sessions that include asynchronous text, voice message, or data message (e.g., not a live voice conversation such as a telephone call) communications between an end user and a contact center agent (e.g., a person, bot, or combination thereof) related to a certain task, such as to change account information or to obtain customer service. In some examples, the intermediary device 105 can receive voice messages that have been sent as audio messages (voicemail) or converted into text messages. The sessions can occur continuously in a conversational manner, or can be intermittent, e.g., lasting over hours, days or weeks with dormant periods between communications. The intermediary device 105 can include at least one server. For example, the intermediary device 105 can include a plurality of servers located in at least one data center or server farm. The intermediary device 105 can receive data messages and can identify characteristics of those data message, for example as part of a contact center operation.

Based on characteristics of the data messages, the intermediary device 105 can assign the data message to the default lobby construct 120 or can bypass the default lobby construct 120 and instead assign the data message to the destination lobby construct 125. For example, the intermediary device 105 can determine that the characteristics of a data message to not match or correlate to characteristics of other data messages that have been assigned to one or more destination lobby constructs 125. In this example, the intermediary device 105 can assign the data message to the default lobby construct 120. When the intermediary device 105 does identify a match or correlation between a (new incoming) data message and a data message assigned to a particular destination lobby construct 125 (or assigned to the default lobby construct 120) the intermediary device 105 can assign the new incoming data message the same lobby construct (e.g., the same destination lobby construct 125 or default lobby construct 120 to which the pre-existing data message having matching characteristics has already been assigned). The lobby constructs hold collections of data messages corresponding to sessions between the contact center agent computing devices 135 and the customers or end users at the client computing devices 130. The plurality of lobby constructs (e.g., default lobby constructs 120 or destination lobby constructs 125) can be identical instances or types of structures, differing only in the collections of data messages they hold, and the teams of contact center agent computing devices 135 to which they assigned. For example, there can be exactly one lobby construct assigned per defined team of contact center agent computing devices 135 to attend to defined issues, such as customer complaints or service issues. The collections of data messages for this team can be held by a single lobby construct.

The intermediary device 105, the lobby assignment mechanism 110, the session storage unit 115, the default lobby construct 120, and the destination lobby construct 125 can each include at least one processing unit, server, virtual server, circuit, engine, agent, appliance, or other logic device such as programmable logic arrays configured to communicate with the session storage unit 115 and with other computing devices (e.g., the client computing device 130 or the contact center agent computing device 135). These communications can occur via the network 140. The intermediary device 105 can include the lobby assignment mechanism 110, the session storage unit 115, the default lobby construct 120, and the destination lobby construct 125 as a single device (data processing system) or as separate devices. For example, the lobby assignment mechanism 110, the session storage unit 115, the default lobby construct 120, or the destination lobby construct 125 can be distributed across one or more than one server or virtual server in data center(s) in one or more physical locations. The lobby assignment mechanism 110, the session storage unit 115, the default lobby construct 120, and the destination lobby construct 125 can be part of the same physical device (e.g., a server) or can be installed on separate devices.

The intermediary device 105 can include at least one data processing system e.g., at least one logic device such as a computing device or server having a processor to communicate with at least one client computing device 130 or at least one contact center agent computing device 135. The intermediary device 105 can also communicate via the computer network 140 (e.g., that is or includes a LAN or other network) with at least one contact center agent computing device 135 in a call or contact center environment. The client computing device 130 and the contact center agent computing device 135 can include a desktop, laptop, tablet, smartphone, flip phone, personal digital assistant, server, client, thin client, end user, mobile, or other computing device. The contact center agent computing device 135 can include a computing device workstation in a contact center or call center environment. The contact center agent computing device 135 can include at least one live interaction component 145, e.g., a script that executes at the contact center agent computing device 135 (or remotely) to provide a chat window, display, or other user interface at the contact center agent computing device 135.

The intermediary device 105 can connect with messaging networks 140 for the sending and receiving of text based messages. This connection can be made through either software based application programming interfaces, or telecom stack protocols such as short message peer to peer protocols. The intermediary device 105 supports connections to multiple networks 140. The messaging networks 140 and intermediary device 105 can exchange fixed length messages, in various text formats such as ASCII, XML and HTML that result in network traffic.

The client computing device 130 and the contact center agent computing device 135 can include user interfaces such as microphones, speakers, touchscreens, displays, keyboards, pointing devices, a computer mouse, touchpad, or other input or output interfaces. The client computing device 130 and the contact center agent computing device 135 can receive, display, modify, or transmit a variety of different data message types, such as text, binary, video, image, voice message, still photography or other types of rich content. The client computing device 130 and the contact center agent computing device 135 can initiate, transmit, or receive discrete communication elements such as text messages, chat messages, app based messages, emoji's, images, video clips and other rich media, e.g., from the intermediary device 105 or from the network 140.

The electronic communications network 140 can include computer networks such as the internet, local, wide, metro or other area networks, intranets, satellite networks, other computer networks such as voice or data mobile phone communication networks, and combinations thereof. The network 140 can include at least one messaging network that transmits text or other data messages that may but need not include the internet. The network 140 can carry or transmit various data message types, such as text, binary, video, image, still photography, hyperlinks, or active instructions to accomplish tasks, or other types of rich content for example.

The lobby assignment mechanism 110, the session storage unit 115, the default lobby construct 120, and the destination lobby construct 125 can include, execute, or respond to at least one computer program or at least one script. The lobby assignment mechanism 110, the session storage unit 115, the default lobby construct 120, and the destination lobby construct 125 can be separate components, a single component, or part of the intermediary device 105. The lobby assignment mechanism 110, the session storage unit 115, the default lobby construct 120, and the destination lobby construct 125 can include combinations of software and hardware, such as one or more processors configured to receive a first data message, assign the first data message to a default lobby construct, obtain an indication that the data message has been transferred to a destination lobby construct, determine that the data message is assigned to the destination lobby construct (and no longer assigned to the default lobby construct), receive a second data message, and bypass the default lobby construct to assign the second data message to the same destination lobby construct as the first data message, based for example on the assignment of the first data messages and common characteristics between the first and second data messages, for example.

The session storage unit 115 can include at least one local, remote, encrypted, unencrypted, or distributed database or memory (including any associated database management system), and combinations thereof that can receive and provide data to and from the intermediary device 105 or its components as well as the client computing device 130 or the contact center agent computing device 135. The session storage unit 115 can reside entirely or in part of at least one the intermediary device 105, the contact center agent computing device 135 or third party computing devices. The session storage unit 115 can include the default lobby construct 120 or the destination lobby construct 125.

The system 100 can include the intermediary device 105 to route text based data messages or to assign data messages to their destination. For example, the intermediary device 105 can be disposed in a data communication path between the network 140 and the client computing device 130. The intermediary device 105 can be part of or in communication with a contact center environment. For example, all or part of the intermediary device 105 can be installed on one or more servers that provide services to a contact center. Portions of the intermediary device 105 such as scripts can be installed at the contact center agent computing device 135. The intermediary device 105 can receive a text based data message. For example, via the network 140, the intermediary device 105 can communicate with (e.g., receive or transmit data messages to or from) at least one end user or client computing device 130.

The intermediary device 105 can receive a data message via the network 140. The data message can include a text message sent from the client computing device 130 to a contact center environment, e.g., intended for the contact center agent computing device 135. The intermediary device 105 can receive the data message via the network 140, which can include a fixed line (e.g., from the signaling channel of an acoustic modem), wireless network, internet, VoIP, cellular, PSTN, fiber optic, SMS or public or proprietary text messaging networks. The data message can be text or image based rather than a human or automated audio or voice transmission. The data message can also be an asynchronous voice transmission (e.g., a voicemail or voice message) that is recorded by the client computing device 130 and then transmitted, rather than a live voice conversation.

The text based data message can include one or more characteristics. Characteristics of the data message can indicate a source of the data message, such as the device from which the data message originated, a network account or social network account from which the data message originated, or an individual from which the data message originated. For example, packet or other protocol based transmissions of data messages can include a media access control address, network interface controller, Ethernet hardware address, programmed address, or other identifier that identifies the client computing device 130 (e.g., a smartphone or tablet).

For example, the characteristic can include a handle or other reference to a resource or username in a communication system (e.g., '@username' of a social network or communication service) or an email address. The characteristic can also include an account identifier (e.g., a phone number of a smartphone or identifier of a social media or email account), serial number, or other device identifier. The characteristic can accompany the text based data message transmitted from the client computing device 130 and received by the intermediary device 105, e.g., on behalf of a contact center. For example, the characteristic can be included within or appended to packet or other protocol based transmissions of the data message through the network 140. The characteristic can also be indicated by metadata or header information that is part of or transmitted with the data message.

The intermediary device 105 can assign data messages to lobby constructs where they can be accessed by contact center agent computing devices 135 for use in a contact center environment. For example an end user at the client computing device 130 may have a question about a cable television bill and may send a text or other text-based data message, or a voicemail message, to a contact center to obtain assistance from a representative. The voicemail message can be translated to text by the client computing device 130 or by the intermediary device 105, or can be provided as an audio file. Data messages can be asynchronous, e.g., one-way, separated in time or having different subject matter content.

The lobby assignment mechanism 110 can assign at least one data message to at least one lobby construct. For example, the lobby assignment mechanism 110 can assign a new data message, or a data message that is determined by the intermediary device 105 to not be part of any preexisting data communication session with contact center agent computing devices 135 to the default lobby construct 120. The indication of the default lobby construct can be stored, for example in the session storage unit 115.

The default lobby construct 120 can include an indication of a plurality of new or unassigned data messages. The default lobby construct can be a general purpose lobby construct (e.g., for any data messages regardless of the subject matter of those data messages) or can operate as a combination of a general purpose lobby construct and a special purpose lobby construct. For example, a dedicated lobby construct can include data messages having subject matter (a characteristic) that indicates complaints about a loss of television cable service. This dedicated or special purpose lobby construct can be accessed by contact center agent computing devices 135 equipped to handle cable service blackouts. (For example, the devices 135 accessing this dedicated lobby construct may have access to data about reported blackouts or other information regarding service interruptions, or the agents operating these devices 135 may be specially trained for this subject matter.) If this dedicated or destination lobby construct also operates as the default lobby construct 120, it may include data messages having subject matter related to service interruptions, as well as data messages that include unrelated subject matter, such as address changes or billing disputes.

The agents (human or automated) operating the contact center agent computing device 135 can access a data message related to a service blackout. The contact center agent computing device 135 can respond to this message by sending a reply or response data message back to the source client computing device 130. However, the agent operating the contact center agent computing device 135 for this lobby construct can also access a data message about a customer address change, which is unrelated to the dedicated purpose of this lobby construct. In this example, the contact center agent computing device 135 (and not the lobby assignment mechanism 110) can transfer or forward the data message related to an address change to a different lobby construct, such as a destination lobby construct dedicated to handling address change queries. The lobby assignment mechanism 110 may not have access to data indicating the existence of the destination lobby construct 125 at the time of this transfer. For example, the lobby assignment mechanism 110 may only have information indicating the existence of a single (default) lobby construct 120, and may initially assign incoming data messages to the only default lobby construct 120 of which the lobby assignment mechanism 110 is aware. A component of the contact center agent computing device 135 (e.g., the live interaction component 145) can access or be used to access the data message in the default lobby construct 120 and to transfer the data message from the default lobby construct 120 to the destination lobby construct 125. The data message can be removed from (or disassociated with) the default lobby construct 120 (or any other lobby construct) upon transfer out from that lobby construct to another lobby construct. For example, the lobby assignment mechanism 110 can remove data messages from lobby constructs.

The lobby assignment mechanism 110 can provide an indication of the presence of the data message in the default (or any other) lobby construct 120 to at least one contact center agent computing device 135. This indication can include a push indication, e.g., an affirmative indication of the presence of the data message in the default lobby construct 120 provided to the contact center agent computing device 135 without, or in the absence of, any prior query for data messages received from the contact center agent computing device 135. The lobby assignment mechanism 110 can also provide indications of data message associations with lobby constructs responsive to queries for the same received from the contact center agent computing devices 135.

The default lobby construct 120 can be the correct or final destination for data messages. For example, the lobby assignment mechanism 110 can add an incoming data message to the default lobby construct 120. A contact center agent computing device 135 can access the data message in the default lobby construct and determine, e.g., from characteristics of the data message and information about the default lobby construct 120 (including information of characteristics of other data messages that reside in or are associated with the default lobby construct 120) that the default lobby construct 120 is the correct final destination of the data message. The lobby assignment mechanism 110 can obtain an indication (e.g., a data transmission) that the default lobby construct 120 is the correct or appropriate destination for the data message. In response, the lobby assignment mechanism 110 can link the data message with the default lobby construct 120.

The intermediary device 105 can receive or otherwise obtain an indication that at least one data message has been transferred from one lobby construct to another. For example, the lobby assignment mechanism 110 can obtain an indication of a transfer of a data message from the default lobby construct 120 (where the data message was originally assigned) to a destination lobby construct 125. The indication of the transfer can be or include a transfer instruction data message that identifies the data message that was transferred and other information such as an identification of the (e.g., default) lobby construct 120 that the data message is transferred from, and the destination lobby construct 125 that the data message is transferred to. The default and destination lobby constructs 120, 125 can be different lobby constructs from one another. For example the different lobby constructs can be designated to handle data messages having different subject matter or other characteristics, or designated as general or default constructs. The transfer instruction data message can be sent from the contact center agent computing device 135 (e.g., from or via the live interaction component 145). The default lobby construct 120 can receive the transfer instruction data message directly from the contact center agent computing device 135 or via the lobby assignment mechanism 110, and can affect the transfer by forwarding the data message to another lobby construct identified in the transfer instruction. The transfer instruction (or a subsequent data transmission from the contact center agent computing device 135 responsible for the transfer of the data message) can indicate that the destination lobby construct 125 is the correct destination for the transferred data message.

The intermediary device 105 can link or otherwise assign the first data message with the destination lobby construct 125. For example, the lobby assignment mechanism 110 can receive the indication of the transfer instruction of the data message. In response, the lobby assignment mechanism 110 can link the data message with the destination lobby construct 125. Once the lobby assignment mechanism 110 has assigned the session or data message from the destination lobby construct 125 to the correct contact center agent computing device 135, the intermediary device 105 can attach future data messages to the session storage unit 115. In the process of contact center agent computing device 135 assignment, the session storage unit 115 can modify the session to indicate that assignment is changed from the destination lobby construct 125 to the appropriate contact center agent computing device 135. The intermediary device 105 (e.g., lobby assignment mechanism 110) can attach or assign future data messages to the session storage unit 115, and can also de-reference them for access by the contact center agent computing device 135.

The link can act as an assignment or confirmation of assignment and can indicate that the data message (or information identifying the data message) appropriately resides in the destination lobby construct 125 as a final or end destination. For example, if the data message has a characteristic such as subject matter regarding an account update such as an address change, the destination lobby construct 125 can be the lobby construct for data messages concerning account changes or updates. A contact center agent computing device 135 can identify the data message in the default lobby construct 120, determine that this is not the correct final destination for the data message, and transfer the data message to the destination lobby construct 125 for account updates, and provide an indication of this transfer to the intermediary device 105. In response, the lobby assignment mechanism 110 can create an identifier or indicator for the data message that indicates that the data message with account based subject matter resides in the appropriate account related destination lobby construct 125. Thus, based on a characteristic of the data message (e.g., subject matter, source indicator, or other information) the lobby assignment mechanism 110 can link the data message to the destination lobby construct 125. An indication of this link or assignment of the data message to the destination lobby construct can be stored in the session storage unit 115 or in the destination lobby construct 125, for example.

The intermediary device 105 can receive a plurality of data messages, e.g., hundreds or thousands or more on a daily basis. The data messages can be sent from different client computing devices 130 and can include their own characteristics, e.g., source or destination information, or subject matter that can be related or unrelated to subject matter of other data message. The intermediary device 105 can receive a first data message, which, after parsing by the lobby assignment mechanism and initial assignment to the default lobby construct 120 gets transferred to the destination lobby construct 125. The intermediary device 105 obtains information about a characteristic of the data message as well as the final destination lobby construct 125, and can link the data message to the destination lobby construct 125 based on this information.

The first data message when initially assigned to the default lobby construct 120 or once assigned to or residing in the destination lobby construct 125, can be accessed by contact center agent computing devices 135 such as those assigned or dedicated to the particular lobby construct 125. The intermediary device 105 can grant or allow such access, for example by indicating the existence of the data message in the default or destination lobby constructs 120, 125.

Subsequent to receiving the first data message, the intermediary device 105 can receive a second data message having at least one characteristic. The second data message can be from the same or a different client computing device 130 as the first data message. The lobby assignment mechanism 110 can parse the second (or any other) data message and identify at least one characteristic of the data message. When, for example, the lobby assignment mechanism 110 determines based on at least one characteristic of the second data message that the second data message is a data message for a new session, unrelated to any pre-existing session or communication between a client computing device 130 and a contact center agent computing device 135, the lobby assignment mechanism 110 can assign the second data message to the default lobby construct 120. The lobby assignment mechanism 110 can also assign inbound data messages directly to the default lobby construct 120 without parsing to determine subject matter or other information about the data messages.

The lobby assignment mechanism 110 can also determine from a characteristic of the second data message that the second data message corresponds to the first data message that resides in the destination lobby construct 125. For example the lobby assignment mechanism 110 can identify a tuple match between characteristics of the first and second data messages, or can otherwise determine a similarity in source, subject matter, metadata, destination, or other information that is part of or associated with the first or second data message. For example, the lobby assignment mechanism 110 can determine that the second data message has a source characteristic (e.g., device identifier, account number, or social media handle) that matches a source characteristic of the first data message. Or the lobby assignment mechanism 110 can determine that the second data message has a subject matter characteristic (e.g., an address update) that matches subject matter of the first data message (e.g., another, different address update or account update). Responsive to determining this correlation or match between the second data message and a first data message based on their respective characteristics, the lobby assignment mechanism 110 can link, assign, or provide the second data message to the same destination lobby construct 125 where the first data message resides. For example, the lobby assignment mechanism 110 can bypass or skip transfer or assignment of the second data message to the default lobby construct 120 and instead link, provide, or assign the second data message (e.g., directly) to the same destination lobby construct 125 to which the first data message has been assigned. An indication of the assignment of the second data message to the destination lobby construct 125 can be provided to the session storage unit 115 for storage.

Assignment of the second (or any other) data message based on its characteristics to the destination lobby construct 125 by bypassing the default lobby construct 120 or other intervening lobby construct leverages the transfer or routing of prior data messages. This results in more efficient or more direct routing of data messages to their final destination lobby construct 125 for analysis and response by the contact center agent computing devices 135 associated with the destination lobby construct. The more efficient routing reduces the volume of computer network data transmissions and computer processing operations, which reduces latency, saves processing capacity, and saves electrical power relative to a non-lobby construct that can result in increased routing operations. Further, at startup or initial integration into the contact center environment, the intermediary device 105 need only identify a single lobby construct, e.g., that the intermediary device 105 can designate as a default lobby construct 120, rather than every available lobby construct or destination of a tree-like contact center environment structure with a plurality of potential destinations for data message. This simplifies initial operation and customization or programming of the intermediary device 105 and reduces re-programming of the intermediary device 105 when available data message destinations change within the contact center environment.

The intermediary device 105 can include multiple destination lobby constructs 125. Some of the destination lobby constructs 125 can include intermediary lobby constructs through which data messages can pass before arriving at the final destination lobby construct. For example, a first contact center agent computing device 135 can transfer a data message from the default lobby construct 120 to a first destination lobby construct 125 because the human or automated agent of the first contact center agent computing device 135 determines that the default lobby construct 120 is not the appropriate location for the data message. The lobby assignment mechanism 110 may or may not receive an indication of this first transfer. The same or a different contact center agent computing device 135 can access the data message in the first destination lobby construct 125, subsequent to the first transfer, and can determine that this too is not the appropriate destination for the data message. For example, the contact center agent computing device 135 can determine that there is a second destination lobby construct 125 associated with subject matter (or other characteristics) that more closely match subject matter (or other characteristics) of the data message than the subject matter/characteristics associated with the first destination lobby construct 125. Responsive to such a determination, the contact center agent computing device 135 can transfer the data message from the first destination lobby construct 125 to the second destination lobby construct 125. The lobby assignment mechanism 110 can receive an indication that the first destination lobby construct 125 is incorrect, as well as an indication of the transfer to the second lobby construct 125.

The intermediary device 105 can determine that different data messages that originate from the same or different client computing devices 130 are part of the same session with the contact center (or are otherwise associated with one another) based on characteristics of the data messages. Data messages having common characteristics can be routed or assigned by the lobby assignment mechanism to the same destination lobby construct 125, in some instances bypassing the default lobby construct 120 or other intervening lobby constructs. From characteristics of data messages, the intermediary device 105 can determine tuples or other ordered pairs corresponding to the data messages. Based on a comparison of the tuples (e.g., a direct tuple match or tuples indicating correlations or other similarities between data messages) the intermediary device 105 can determine that a second (subsequent) inbound data message can be assigned to the same destination lobby construct 125 where a previously assigned first inbound data message already resides.

The tuple can indicate one or more characteristics of the data message, such as source or destination of the message, the format of the data message, the app or program (e.g., application platform) used to generate or transmit the data message, the device or type of device of the client computing device 130, IP address, an end user associate with the data message, or other information. The intermediary device 105 (or a component thereof such as the lobby assignment mechanism 110) can determine that at least one characteristic indicated by the tuple of the data message (e.g., a handle of an end user, account number, or source identifier) matches at least one characteristic of one or more other data messages. The match indicates a correlation between data messages, such as a common source, destination, identifier, handle, or subject matter.

One or more data messages previously assigned to the same or different destination lobby constructs 125 can have the same tuple (or can share at least one characteristic) as the inbound data message under examination by the lobby assignment mechanism 110. The intermediary device 105 can identify this commonality between the inbound (second) data message and a pre-existing first data message. When there is no commonality or other match, the intermediary device 105 can identify the absence of the tuple match between the inbound data message and characteristics of other pre-existing data messages. The absence of a tuple match can indicate that the inbound data message is a first message of a new session or otherwise belongs to a new session. The lobby assignment mechanism 110 can assign such a data message to the default lobby construct 120 until a contact center agent computing device 135 either responds to the data message from the default lobby construct 120 or transfers the data message to a destination lobby construct 125.

The lobby assignment mechanism 110 or other intermediary device 105 component can identify the tuple based on the characteristic(s) of the inbound data message under examination and a characteristic of the previously examined data message (e.g., characteristic such as a destination identifier indicating, for example, a utility company). For example, an end user having the handle identifier, "@Thomas" could send a text based data message via a social network, text messaging app, or other communications platform to the utility company having the destination identifier "@CableCo." The lobby assignment mechanism 110 can query the session storage unit 115 or a lobby construct (where data messages or indications of their characteristics are stored) to determine that other data messages with a matching tuple (e.g., "@Thomas" and "@CableCo") do or do not exist. Existence of a matching tuple associated with the pre-existing data message can indicate that Thomas is already in contact with the Cable Company via a pre-existing session.

Based on this match the lobby assignment mechanism 110 can assign the (new) data message sent from "@Thomas" to "@Cable Company" to the same destination lobby construct 125 as other data messages having the same tuple. In this example, the tuple of the data message indicates that the data message corresponds to a pre-existing session. Telephone numbers of the client computing device 130 or other characteristics can be used as part of the tuples or to indicate a common thread or characteristic among the data messages. The lobby assignment mechanism 110 (or other intermediary device 105 component) can tag new data messages with a unique identifier of the pre-existing session, allowing for future processing by the intermediary device 105 optimized for data message processing. For example, based on the tag, the lobby assignment mechanism 110 can determine that future data messages having the same tuple should be assigned to the same destination lobby construct 125.

The lobby assignment mechanism 110 can parse or evaluate the data message (including any metadata such as a location, keyword, topic, or phone number) to identify at least one characteristic of the data message (e.g., an identifier of the end user or of the client computing device 130). For example, informational data messages can include source and destination addresses, formatted such as @thomas for social networks or +15085551212 for mobile telcom networks, along with the payload of the message, such as "I have a problem with my bill", and various meta-data about the message such as the time of creation, a unique identifier for the message, or a Boolean flag indicating whether or not the data message has been delivered before. Based on these characteristics, and matches with characteristics of other data messages, the lobby assignment mechanism 110 can assign the parsed data message to a lobby construct such as the default lobby construct 120 or the destination lobby construct 125.

The intermediary device 105 or component thereof such as the lobby assignment mechanism 110 can determine that the inbound text based data message is a new session when no tuple corresponding to a pre-existing session exists. The lobby assignment mechanism 110 can provide the new data message to the default lobby construct 120 for response or possible transfer to a different lobby construct by at least one contact center agent computing device 135.

The lobby assignment mechanism 110 can determine that a data message is associated with a previously evaluated data message based on a direct match between the respective tuples of the two data messages. For example, with a direct match the lobby assignment mechanism 110 can determine that the same "'@Thomas'@Cable Co'" tuple from the (new) data message exists for a pre-existing data message, assigned to a particular destination lobby construct 125. This indicates that the user having the handle identifier @Thomas has already sent data message communications to the contact center environment having the destination identifier @Cable Co.

The lobby assignment mechanism 110 can also determine that the (new inbound) data message should be assigned to the same destination lobby construct 125 as a previously received data message based additional information beyond a direct tuple match. For example, the lobby assignment mechanism 110 can identify a data message from @Thomas to @Cable Co that was received today, and can identify a previous data message between @Thomas and @Cable Co from one year ago. Based, for example, on the one year time gap, (or a time period greater than a threshold value), the lobby assignment mechanism 110 can evaluate subject matter of the data message and of the pre-existing session to see if there is subject matter match. For example, today's data message can include the terms "overcharge on my bill" and the pre-existing data message can include the terms "address change". Or the lobby assignment mechanism 110 can determine that the data messages of the previous data message do not include the terms "overcharge" or "bill". Based on the different subject matter the lobby assignment mechanism 110 can determine that a tuple-based match does not exist between the data message and the pre-existing session due to the differences in subject matter, despite a direct match between the tuples. In these and other examples, the lobby assignment mechanism 110 can include subject matter comparisons (e.g., term based) or time thresholds (e.g., one year) between the (new) data message and a previous data message. The threshold or comparisons can be customized for individual customers or end users. When the threshold is satisfied, the lobby assignment mechanism 110 can assign the new data message to the same destination lobby construct 125 as a previous data message. When the threshold is not satisfied, the lobby assignment mechanism 110 can assign the new data message to any default lobby construct 120.

The handle identifier "@Thomas" and the destination identifier "@Cable Co" are examples and the characteristics of the data messages. The characteristics of the data message can include other identifiers, such as subject matter terms, a phone numbers of the client computing device 130, a device identifier of the client computing device 130, destination phone numbers or other identifiers of the entity that is associated with the data message (e.g., that the end user is trying to reach).

Subsequent to assignment of a first data message, the intermediary device 105 can receive a second data message having at least one characteristic. The second data message can be associated with a source identifier (e.g., "@Gary") and a destination (e.g., a phone number or destination address of a utility company) or other characteristics. The lobby assignment mechanism 110 can identify an absence of a tuple match between the second data message and other previously received data messages. For example, the second message may have the source-destination (or other characteristic) tuple "source:@Gary" and "dest:Phone Co". The lobby assignment mechanism 110 can determine that none of the previously received data messages have a matching tuple of "source:@Gary" and "dest:Phone Co". This indicates that no other data messages have been sent from the same source (e.g., Gary) to the same destination (e.g., a phone company). In this example, the lobby assignment mechanism 110 identifies an absence of a tuple based on characteristics of the second data message and characteristics of previously received data messages. Based on the absence of a tuple match between the second data message and the pre-existing data messages, the lobby assignment mechanism 110 can identify the second data message as a new session. The lobby assignment mechanism 110 can provide the data message of the new session to the default lobby construct 120.

The intermediary device 105 can attach to or communicate with messaging networks 140 to establish communications sessions on behalf of a network handle, such as @testcorp for a social network or +15085551212 for a short message service. The lobby assignment mechanism 110 can place (or confirm placement of) the data message into a lobby construct such as the default lobby construct 120 or the destination lobby construct 125. The lobby construct can include data messages or indications of the end users of client computing devices 130 that have not been matched with human members of an organization. The contact center agent computing device 135 can transfer the data message from one lobby construct to at least one other lobby construct.

The intermediary device 105 in the contact center environment can determine that data messages are (or are not) part of a pre-existing session. The session can be a text based communication session between the end user (at the client computing device 130) and a contact center agent or other representative at the contact center agent computing device 135. Multiple individual data messages can be aggregated or clustered together to form or define a session. For example, a series of back and forth text messages between the client computing device 130 and the contact center agent computing device 135 that pertain to common subject matter such as a billing query can be identified by the intermediary device 105 as a session. The intermediary device 105 can provide the sessions for storage in and retrieval from the session storage unit 115. The lobby assignment mechanism 110 can assign data messages from the same session to the same destination lobby construct.

The lobby assignment mechanism 110 can assemble or aggregate data messages into logical groups called sessions. Unlike other real time communications modes like audio and video that have an explicit start and stop to a conversation, data messages via messaging based networks can be considered stateless, e.g., without explicit indications of beginnings and ends of conversations, such as disconnecting a voice call. The lobby assignment mechanism 110 can mark the beginning and end of sessions, e.g., conversations. The intermediary device 105 can append newly received data messages to a pre-existing session, or can create a new session for the data message. The lobby assignment mechanism 110 can connect with the session storage unit 115 to insert incoming data messages or to retrieve outgoing data messages for transmission via the network(s) 140. The lobby assignment mechanism 110 can also collect meta-data information about the source of the inbound data message, including characteristics such as the network identifier, messaging network, device location, and in the case of social messaging or with end user consent, details such as the parties name or telephone number. The lobby assignment mechanism 110 can send a confirmation receipt message to the originating party, responsive to receipt of a data message.

The lobby constructs can store data messages or sessions of data messages until they are responded to or transferred to another lobby construct by an agent or supervisor. By pooling sessions of data messages and establishing ownership of them, the lobby constructs provide a scale and reliability advantage. By existing in multiplicity in the system, dedicated hardware can be assigned to each lobby construct, allowing them to scale linearly. In addition, having multiple session lobbies assures that a failure of one or more session lobbies (to a failure maximum of N−1 session lobbies when N session lobbies exist in the system 100) does not disable the session lobby function, resulting in a more reliable system 100.

The default and destination (or any other) lobby construct 120, 125 can include a location in the session storage unit 115 where the data messages can be universally accessed by the contact center agent computing devices 135. The lobby assignment mechanism 110 can affirmatively select and provide (e.g., push) a data message to one or more contact center agent computing devices 135. The contact center agent computing devices 135 can also affirmatively select (e.g., pull) a pre-existing session from the lobby construct of the intermediary device 105. For example, the contact center agent computing device 135 can retrieve or otherwise access or select the modified (or any other) pre-existing session subsequent to creation or classification of the modified pre-existing session by the session lobby mechanism 120.

The characteristics of the data messages can indicate information about sources, destinations, logistics, timing information, or subject matter of the data messages. For example the characteristics can indicate a specific device (e.g., by device identifier), IP address, media access control address, unique identifier, or a type of device (e.g., a make, model, or brand of smartphone), or application. The lobby assignment mechanism 110 can identify characteristics of data messages as characteristics of application platforms, such as a particular text or chat messaging application, or social network, or a particular device or type of device. Different data messages can have different characteristics. For example, a first data message can include a characteristic of a first application platform indicating that the first data message was sent from a text message application that executes at the client computing device 130. The second data message can include a characteristic of a second application platform, indicating for example that the second data message was sent via a social network app. The lobby assignment mechanism 110 can identify the first and second characteristics, and can determine whether or not they are related or should be assigned to the same destination lobby construct 125. Despite the first and second data messages having characteristics corresponding to different application platforms (e.g., one was sent via text message, the other via a social media message), the lobby assignment mechanism 110 can determine that both the first and second messages are part of one pre-existing session or should otherwise be assigned to the same destination lobby construct 125. For example, the lobby assignment mechanism 110 can determine that the first and second messages have common subject matter (e.g., a complaint about a cable bill, or a helpdesk request to operate a device), or that both the first and second message originated from the same client computing device 130 (but via different apps). Despite originating in different format (e.g., via different application platforms) the lobby assignment mechanism 110 can determine matching tuples between the data messages and tuples associated with pre-existing sessions to match the two data messages with the same pre-existing session. In this example, the lobby assignment mechanism 110 can determine that different data messages having characteristics indicating different platforms correspond to a pre-existing session and should both be routed to the destination lobby construct 125 associated with the pre-existing session.

The lobby assignment mechanism 110 can determine tuples or ordered pairs, such as a 2-tuple for each inbound data message received by the intermediary device 105. The lobby assignment mechanism 110 (or other intermediary device 105 component) can identify the same or a related tuple from data messages of pre-existing sessions stored for example in the session storage unit 115.

For example, the intermediary device can receive a first data message, having at least one characteristic, and can determine a tuple for the first message. Based, for example, on a match between this tuple and at least one tuple of a data message of a pre-existing session, the lobby assignment mechanism 110 can assign the first data message to a destination lobby construct 125 to which other data messages of the pre-existing session have been assigned. Continuing with this example, the intermediary device 105 can also receive a second data message having at least one characteristic, and the intermediary device 105 (e.g., the lobby assignment mechanism 110) can determine a second tuple for the second message. The first tuple and the second tuple can be the same or different from one another. The lobby assignment mechanism 110 can identify a match between the second tuple and at least one tuple of any data message of the same pre-existing session. This can be the same match or a different match as the match between the tuple of the first data message with a tuple of the pre-existing session. Based on the tuple-based analysis, the lobby assignment mechanism 110 can assign the second data message to the same destination lobby construct 125 as the first data message.

Figure 2:
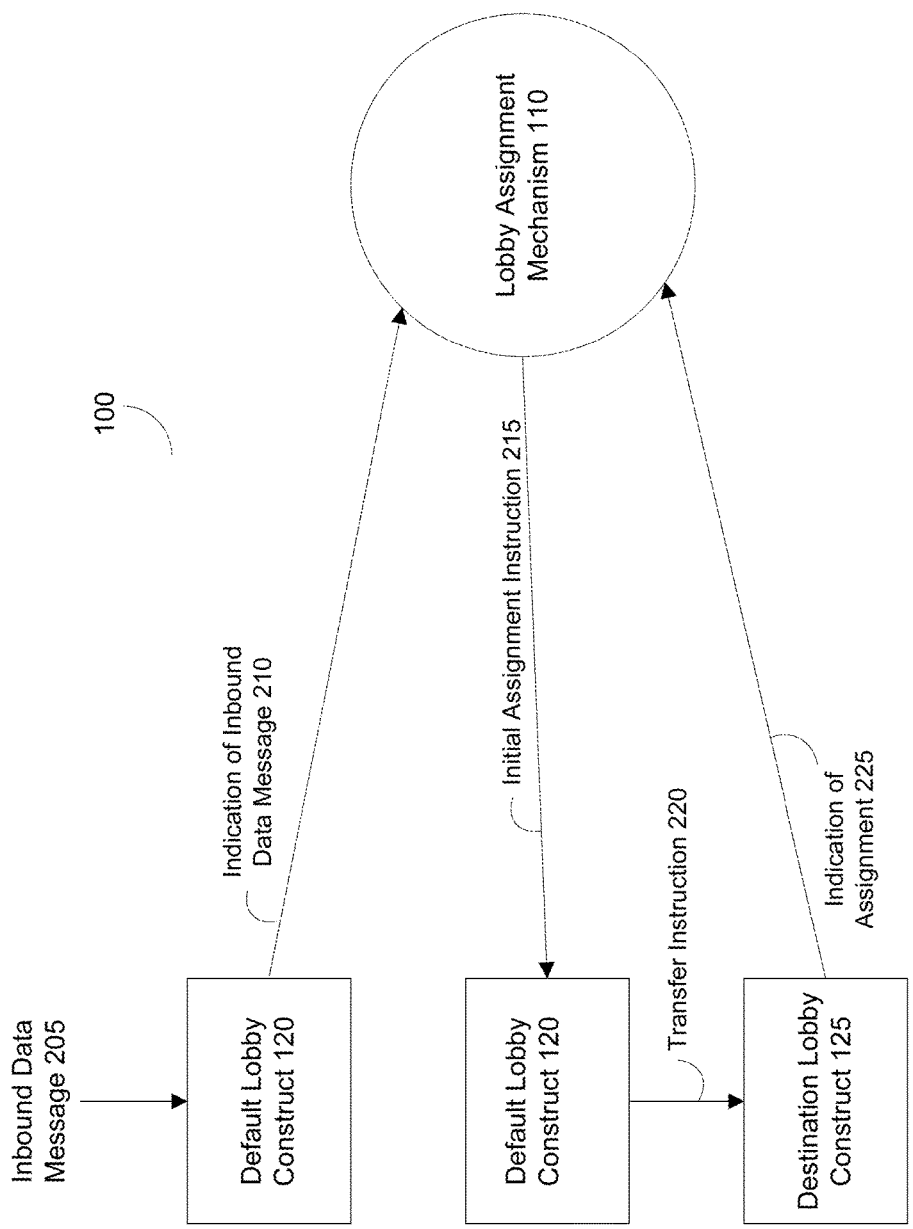
FIG. 2 is a functional diagram of an example system that routes data messages.

FIG. 2 depicts the system 100 for routing or assigning data messages in a contact center environment. The inbound data message(s) 205 can be received by the default lobby construct 120. The data message 205 or an indication 210 of the data message 205 can be passed to the lobby assignment mechanism 110. The lobby assignment mechanism 110 can respond with an assignment instruction 215 to initially assign the data message 215 (e.g., back) to the default lobby construct 120.

At least one contact center agent computing device 135 can access the data message 205 when assigned to the default lobby construct 120. Upon determining that a different lobby construct is a more suitable location for the data message, the contact center agent computing device 135 can provide the transfer instruction 220 to remove the data message 205 from the default lobby construct 120 and to provide it to the destination lobby construct 125. The lobby assignment mechanism 110 can receive, from the destination lobby construct 125 or from the contact center agent computing device 135, an indication 225 of the assignment of the data message to the destination lobby construct 125. The lobby assignment mechanism 110 can assign data message 205 (or consider the data message 205 assigned) to the destination lobby construct 125. Based for example on tuple comparisons that indicate a match, correlation, or similarity, the lobby assignment mechanism 110 can bypass the initial assignment instruction 215 and instead provide an assignment instruction for the subsequent data message 205 to the destination lobby construct 125 (and not to the default lobby construct 120).

Figure 3:
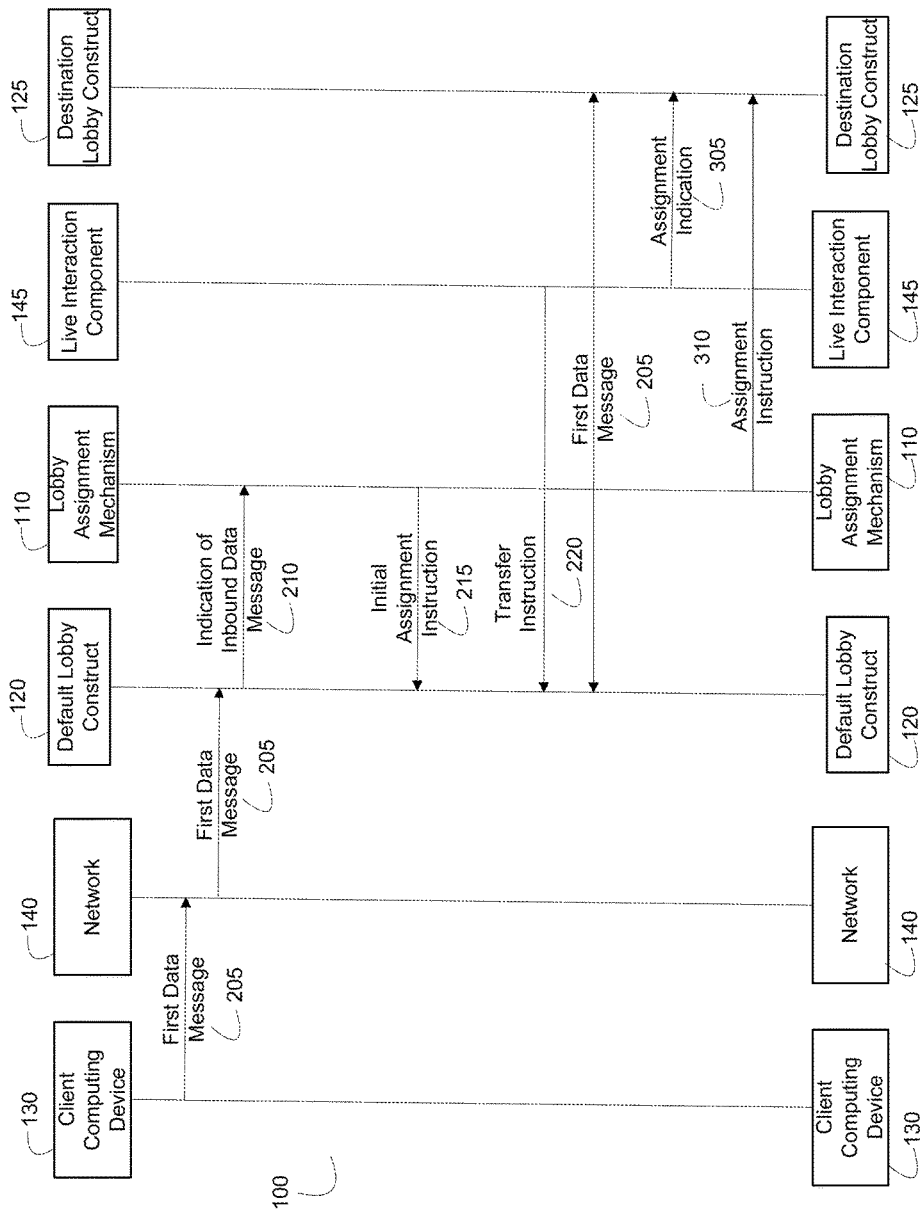
FIG. 3 is a functional diagram of an example system that routes data messages.

FIG. 3 is a functional diagram of the example system 100 that assigns or routes data messages. Referring to FIG. 1 and FIG. 2, among others, the system 100 can include a contact center environment (e.g., call center, customer service, or help desk environment that includes the capability to route, service, and respond to non-voice data message communications). The client computing device 130 can send at least one (first) data message 205 via the electronic communications network 140 to the lobby assignment mechanism 110. The data message 205 can include at least one characteristic, such as source, destination, subject matter, end user, or computing device 130 information.

The lobby assignment mechanism 110 can obtain an indication of the data message 205. This can be a first data message or data message of a new session that lacks a tuple or other match with previous date messages. The default lobby construct 120 can receive the (first) data message 205, and the lobby assignment mechanism 110 can identify the data message 205 residing in the default lobby construct 120. The lobby assignment mechanism 110 can provide the initial assignment instruction 215 to assign the data message 205 to the default lobby construct 120 where it may currently reside upon receipt from the client computing device 130. This initial assignment of the data message 205 to the default lobby construct 120 where it already resides avoids multiple programming paths and race condition events that may occur due to a sequence of transfers to lobby constructs during operation. For example, multiple lobby assignment mechanisms 110 can be deployed to increase system 100 capacity, reduce assignment delays or increase reliability. However, all of these multiple lobby assignment mechanism 110 deployments can result in a distributed system 100 without coordination between the components. Race conditions exist when more than one processor is instructed that it owns the same resource, resulting in confusion in the state of resource, for example when one processor modifies the state of the resource, unbeknownst to the others. Ownership by a single lobby construct provides an atomicity in assignment of the data messages 205, and therefore substantially reduces or eliminates the case where more than one processor believes that it owns the resource (e.g., the data message 205), relieving each of the components themselves of the responsibility of coordination. In some examples, the lobby assignment mechanism 110 can also receive the data message 205 without the data message 205 first being received by the default lobby construct.

The data message 205 assigned to the default lobby construct 120 can be accessed by the live interaction component 145 of a contact center agent computing device 135. The contact center agent computing device 135 can provide the transfer instruction 220 to the default lobby construct 120, where it can be received to cause the data message 200 to transfer from the default lobby construct 120 to the destination lobby construct 125. The same or a different contact center agent computing device 135 can access the data message after the transfer, when the data message resides in the destination lobby construct 125. This contact center agent computing device 135 can determine that the destination lobby construct 125 is appropriate for the data message. For example, the live interaction component 145 can provide an assignment indication 305 to the destination lobby construct 125 (or to the lobby assignment mechanism 110) indicating that the data message 205 has reached its final destination where it can be accessed and replied to by the contact center agent computing device 135. The contact center agent computing device 135 can also determine that the destination lobby construct 125 is not the appropriate final destination for the data message 205 and can transfer the data message 205 to another, different, destination lobby construct.

Responsive, for example to the assignment indication 305, the lobby assignment mechanism 110 can provide the assignment instruction 310 to assign the data message 205 to the destination lobby. The lobby assignment mechanism 110 can provide the data messages including associated metadata (e.g., characteristics) in the session storage unit 115. The lobby assignment mechanism 110 can use this and other information (e.g., from the assignment indication 205) to determine that the destination lobby construct 125 is the appropriate destination for the (first) data message 205. The lobby assignment mechanism 110 can now assign subsequent data messages having matching tuples or common characteristics (e.g., directly) to the destination lobby construct 125, bypassing the initial assignment instruction 215 to the default lobby construct 120 or bypassing other lobby constructs such as intermediary destination lobby constructs 125 that the data message 205 was transferred into and then out of on its way to the (final) destination lobby construct 125. This bypassing reduces data transfers of subsequent data messages, which reduces latency as the subsequent data messages proceed more directly to the final destination lobby construct 125. This also reduces processing operations associated with eliminated intermediary transfers, reduces memory requirements, and saves electrical power.

The data messages 205 can be stored in the session storage unit 115 as information blocks, and can indicate the parties to a session 215, assignment state, keywords and other metrics or characteristics derived from the session 215. The lobby assignment mechanism 110 can manage the data blocks. Data corresponding to the data messages 205 can be identified as expired, or can be removed, for example to protect confidential details such as financial or health care data.

Data messages 205 that the lobby assignment mechanism 110 does not assign to a destination lobby construct 125 can be held by the lobby assignment mechanism 110 in the lobby construct. The lobby constructs provide the intermediary device 105 with the ability to determine how a data message 205 should be processed, e.g., by a particular contact center agent computing device 135. Further, the assignment of data messages 205 to a lobby construct under makes such assignments atomic, which can reduce race conditions between multiple parties assigning data messages 205 that increases the session capacity of the system 100. The intermediary device 105 can receive indications of changes in the session storage unit 115, can receive session objects (e.g., data messages 205 or related information) from the session storage unit 115, and can provide the session objects to the contact center agent computing device 135 (e.g., the live interaction component 145) for visual display, for example to allow for responses from the agent at the computing device 135.

The lobby assignment mechanism 110 can assign the data messages 205. The lobby assignment mechanism 110 can increase the efficiency of the system 100 by reducing or eliminating the need for humans to make decisions about how data messages 215 should be handled. In addition, the encapsulation of assignment logic by the lobby assignment mechanism 110 enables the deployment of multiple assignment strategies of data messages 205, (e.g., assignment to the least loaded lobby construct). The lobby assignment mechanism 110 can subscribe to changes in the session storage unit 115, can receive the data messages 205 or other corresponding information) from the session storage unit 115. The lobby assignment mechanism 110 can be enabled or disabled on request of at least one contact center agent computing device 135. Upon or subsequent to assignment of the date message 205, the lobby assignment mechanism 110 can request updates from the session storage unit 115 to indicate which live interaction component 145 is responsible for responding to the data message 205.

Figure 4:
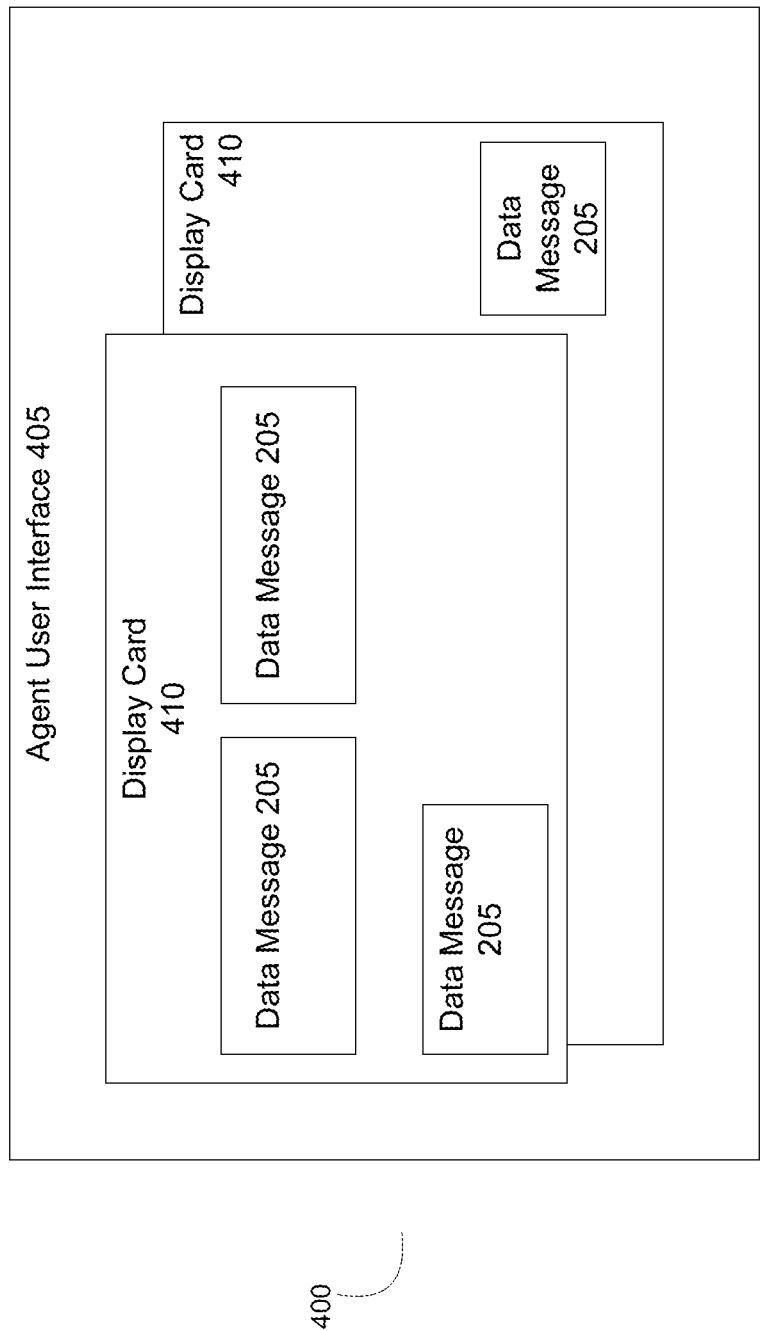
FIG. 4 is an example illustration of a data message display on a computing device in a contact center environment.

FIG. 4 depicts a data message display 400 on the contact center agent computing device 135 in, for example, a contact center environment. The display 400 can be rendered by the live interaction component 145 (e.g., a browser-based application) and can be part of or include the agent user interface 405 displayed to the agent operating the contact center agent computing device 135. Data messages 205 or other portions of the corresponding sessions can be displayed in at least one display card 410 of the agent user interface 405. The display card 410 can represent sessions that include the data messages 205 or portions thereof. The agent user interface 405 can include a plurality of display cards 410, each including at least one data message 205 of one or more sessions.

The intermediary device 105 can control the positioning, juxtaposition, and display of the display cards 410 or of the data messages 205 within the display cards 410. For example, the contact center agent computing device 135 (or the intermediary device 105) can execute a script or application that positions the display cards 410 within the agent user interface 405 so that they do not overlap each other. The contact center agent computing device 135 or the intermediary device 105 can also position the display cards 410 within the agent user interface 405 so that they do at least partially (e.g., partially or completely) overlap each other.

Display cards 410 associated with the same client computing device 130, or having content related to the same subject matter can partially overlap each other to preserve available display space on the display of the contact center agent computing device 135. The contact center agent computing device 135 (or the intermediary device 105) can execute a script or application that sorts or positions the display cards 410 based on categories associated with the display cards, such as subject matter, client computing device 130, urgency, or a time since the display card 410 was received, rendered, or last accessed by the client computing device 130. The agent user interface 405 or other display at the contact center agent computing device 135 that includes the display cards 410 can be browser based or non-browser based.

The intermediary device 105 can provide the data message 205 to the live interaction component 145 for display as the display card 410 by or within the agent user interface 405. The display card 410 can be displayed in juxtaposition with one or more additional display cards 410 within the agent user interface 405 of the contact center agent computing device 135. The display cards 410 can correspond to data messages 205 of different sessions, e.g., different asynchronous conversations between the agent at the contact center computing device 135 and different end users at different client computing devices 130. For example at least two of the display cards 410 can at least partially overlap each other in the agent user interface 405.

The agent or operator interfacing with the agent user interface 405 can select one or more data messages 205 from one or more display cards 410, and can respond to a data message 205 directly, e.g. via a response message to the client computing device 130, or can provide at least one data message to automated assistant for generation of an automated response. Via the agent user interface 405, the agent can also decline a display card 410 or data message 205. For example, the contact center agent computing device 135 can transfer the data message from the default lobby construct 120 to the destination lobby construct 125 (or from any one lobby construct to any other lobby construct) because the contact center agent computing device 135 (or the agent operating the device) can determine that the data message 205 is in the incorrect lobby construct and should be transferred. An indication of this transfer of a data message 205 can be provided to the default lobby construct 120, or to the lobby assignment mechanism 110 (or other intermediary device 105 component) as the transfer instruction 220. The contact center agent computing device 135 can also indicate that the data message 205 is correctly assigned to the lobby construct in which it resides (e.g., the default lobby construct 120, or to the destination lobby construct 125) as the assignment indication 225.

The data message 205 can reside in any lobby construct managed by or associated with the intermediary device 105 in the contact center environment. The example the data message 205 or an indication of its existence can be stored in the session storage unit 115 with other data messages of one or more sessions. The data message 205 can be accessed by at least one live interaction component 145 of at least one contact center agent computing device 135. The live interaction component 145 can include a script or program that executes to display at least one display card 410 within the agent user interface 405 on the contact center agent computing device 135. The live interaction component 145 can be installed and can execute locally at the contact center agent computing device 135, or can be installed remotely (e.g., at a server in the data center independent of, associated with, or as part of the intermediary device 105) to provide the agent user interface 405 at the contact center agent computing device 135.

Figure 5:
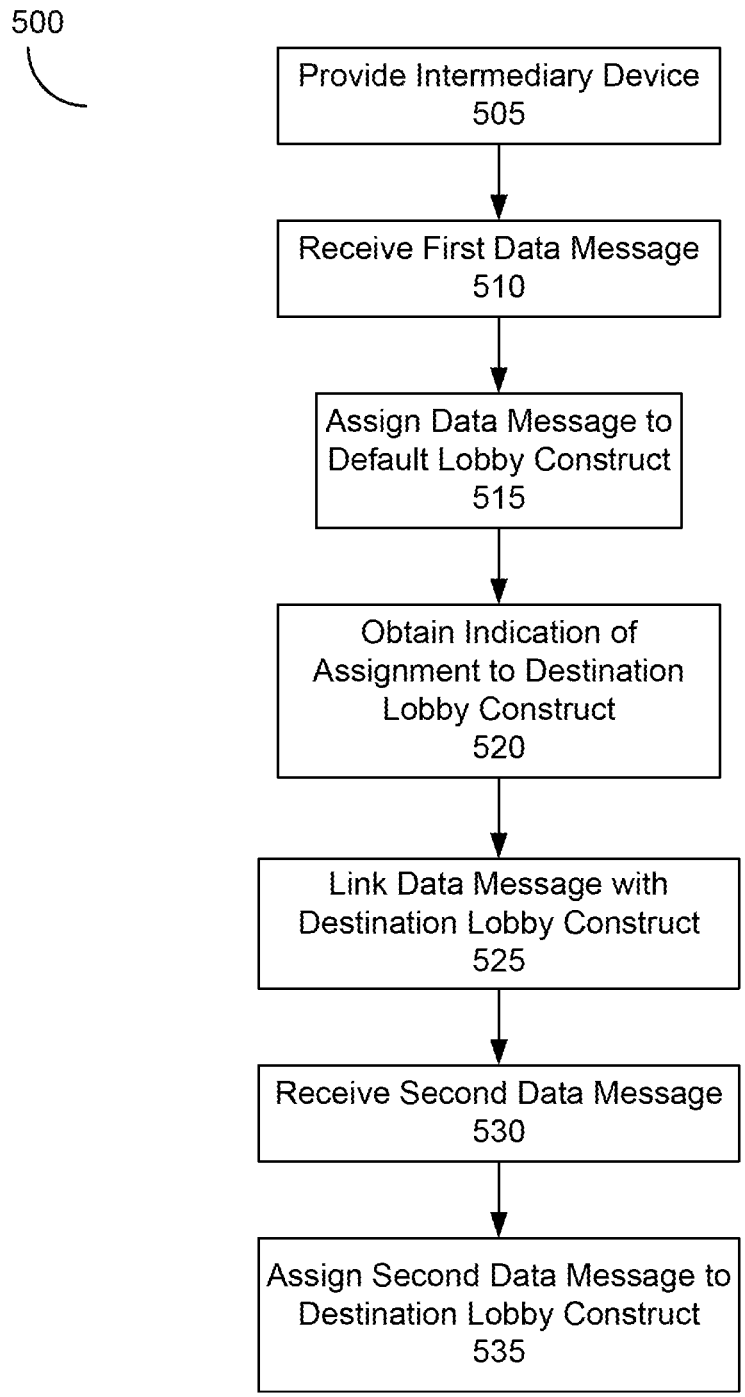
FIG. 5 is a flow diagram depicting an example method of managing data messages.

FIG. 5 depicts an example method 500 of managing (e.g., routing or assigning) data messages in a contact center environment. The method can include providing the intermediary device 105 (ACT 505). The intermediary device 105 can be disposed in a data communication path between the electronic communications network 140 and the client computing device 130, for example in a contact center environment. The intermediary device 105 can include at least one lobby assignment mechanism 110, at least one session storage unit 115, at least one default lobby construct 120, or at least one destination lobby construct 125. The method 500 can receive at least one (e.g., first) data message (ACT 510). The data message can include at least one characteristic. For example, the intermediary device 105 can receive at least one data message such as a text message from the client computing device 130 via the electronic communications network 140.

The method 500 can assign the data message to the default lobby construct (ACT 515). For example, the lobby assignment mechanism 110 can assign, forward, provide, link, tag, or associate the data message together with other data messages in the default lobby construct 120 based, for example on source or subject matter similarities or other characteristics. An indication of the transfer of the data message to the default lobby construct can be stored in the session storage unit 115. At least one contact center agent computing device 135 can access the data message in the default lobby construct 120. The method 500 can receive an indication of assignment of the data message to the destination lobby construct 125 (ACT 520). For example, a contact center agent computing device 135 can access or view the data message in the default lobby construct 120, determine that the data message does not belong in the default lobby construct (e.g., based on a characteristic of the data message), and transfer (e.g., provide an instruction to transfer) the data message from the default lobby construct 120 to the destination lobby construct 125 where the contact center agent computing device 135 determines is a correct or more appropriate location for the data message. The intermediary device 105, or component thereof such as the lobby assignment mechanism 110, can receive an indication of the transfer to the (correct) destination lobby construct 125 from the default lobby 120, from the destination lobby construct 125, or from the contact center agent computing device 135 that instructed the transfer (ACT 520). The received indication of the transfer (ACT 520) can include data identifying the transferred data message, such as an identifier, source information, time stamp data, or other information.

The method 500 can link the data message with the destination lobby construct 125 (ACT 525). The linking of the data message with the destination lobby construct 125 can constitute an assignment of the data message to the destination lobby construct 125. For example, the lobby assignment mechanism 110 can link the data message to the destination lobby construct 125 by determining that the data message resides in the destination lobby construct 125, or by generating an identifier that indicates that the data message resides in, corresponds to, or is part of the destination lobby construct 125. The destination lobby construct 125 can be considered the final end destination of the data message, and the destination lobby construct 125 can be accessed by contact center agent computing devices 135 assigned to data messages having common characteristics and that are present in the (same) destination lobby construct 125.

The method 500 can receive a second data message (ACT 530). For example, the intermediary device 105 can receive a second data message from the same client computing device 130 or a different client computing device 130 that is the source of the first data message (ACT 530). The first and second data messages can have common characteristics, such as a common tuple, or source, destination, identifier, or subject matter commonalities.

The method 500 can assign the second data message to the destination lobby construct 125 (ACT 535). For example, the lobby assignment mechanism 110 can compare characteristics of the first and second data messages, with the first data message already assigned to the destination lobby construct 125 and the second (inbound) data message being unassigned. Based on matching, similar, or corresponding characteristics, such as a tuple match, the lobby assignment mechanism 110 can determine that the destination lobby construct 125 is the appropriate final destination for the second data message. To assign the second data message to the destination lobby construct 125 (ACT 535) the lobby assignment mechanism 110 can bypass at least one lobby construct. For example, the lobby assignment mechanism 110 can provide the second data message to the destination lobby construct 125 without first assigning the second data message to an intervening lobby construct such as the default lobby construct 120 or an intermediate or intervening lobby construct such as another destination lobby construct 125. Contact center agent computing devices 135 can access the first and second (and any other) data messages from the destination (or other) lobby construct to which they have been assigned, and can provide responsive data messages to back to the client computing device 130 that is the source of the data message(s).

The intermediary device 105 can manage messaging based communications in help desk, customer service, or other contact center settings between human members of an organization (e.g., contact center agents), automated assistants or bots and end users of the client computing devices 130. The intermediary device 105 facilitates data message 205 communications based on text messaging instead of live voice communications. The intermediary device 105 connects to one or more electronic communications networks 140, such as messaging networks, short message service networks, or social messaging networks, and establishes communications sessions whereby data messages 205 are transmitted between two or more parties. The intermediary device 105 can establish the sessions using messaging. The intermediary device 105 supports transitions to and from humans and automated assistants in a single session (or transmission of data messages 205).

By assigning data messages to lobby constructs, the intermediary device 105 optimizes the ability for the agent at the computing device 135 to control, direct or interpret the emotional content of the data messages 205, while maintaining the efficiencies of automation. Also, the intermediary device 105 can provide data messages 105 in an asynchronous manner, which provides substantial user experience benefits to the outside party. For example, sessions 215 can last for days, but the end user at the client computing device 130 does not have to remain constantly engaged.

Figure 6:
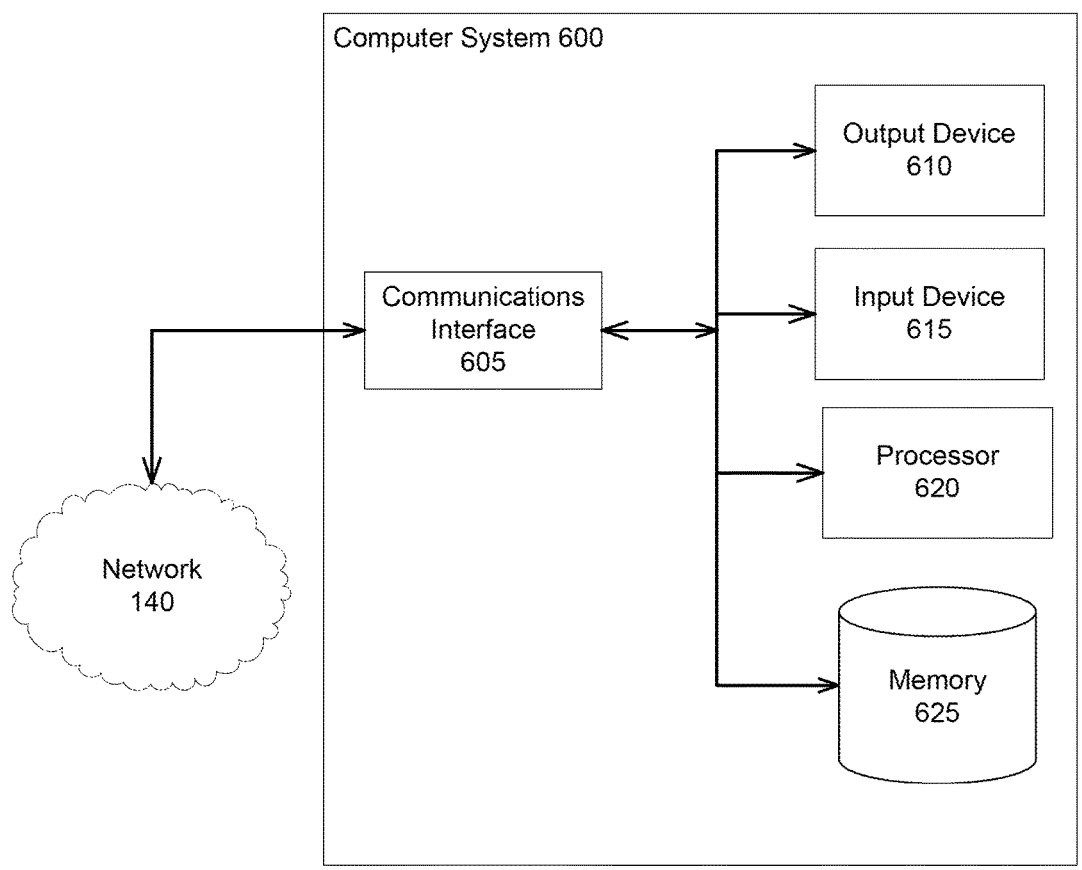
FIG. 6 is a block diagram illustrating a general architecture for a computer system that may be employed to implement elements of the systems and methods described and illustrated herein.

FIG. 6 shows the general architecture of an illustrative computer system 600 that can implement any of the computer systems discussed herein, including system 100 and the intermediary device 105 and its components such as the lobby assignment mechanism 110, the session storage unit 115, the default lobby construct 120, or the destination lobby construct 125. The computer system 600 can provide information via the network 140, for example to assign or route data messages to or from lobby constructs (e.g., the default lobby construct 120 or the destination lobby construct 125) accessible by contact center agent computing devices 135 in a contact center environment. The computer system 600 can include one or more processors 620 communicatively coupled to at least one memory 625, one or more communications interfaces 605, one or more output devices 610 (e.g., one or more display units) or one or more input devices 615. The processors 620 can be included in the intermediary device 105 or the other components of the system 100 such as the lobby assignment mechanism 110, the session storage unit 115, the default lobby construct 120, or the destination lobby construct 125.

The memory 625 can include computer-readable storage media, and can store computer instructions such as processor-executable instructions for implementing the operations described herein. The system 100, or the intermediary device 105, the session storage unit 115, the default lobby construct 120, the destination lobby construct 125, the client computing device 130, or the contact center agent computing device 135 can include the memory 625 to store data messages, message characteristics, tuple information, data message sessions, or session data associated with the contact center environment or with communications between the client computing device 130 and the contact center agent computing device 135, for example. The at least one processor 620 can execute instructions stored in the memory 625 and can read from or write to the memory information processed and or generated pursuant to execution of the instructions.

The processors 620 can be communicatively coupled to or control the at least one communications interface 605 to transmit or receive information pursuant to execution of instructions. For example, the communications interface 605 can be coupled to a wired or wireless network (e.g., network 140), bus, or other communication means and can allow the computer system 600 to transmit information to or receive information from other devices (e.g., other computer systems). One or more communications interfaces 605 can facilitate information flow between the components of the system 100. The communications interface 605 can (e.g., via hardware components or software components) to provide a website or other interface (e.g., the live interaction component 145) as an access portal to at least some aspects of the computer system 600 or system 100. Examples of communications interfaces 605 include user interfaces.

The output devices 610 can allow information to be viewed or perceived in connection with execution of the instructions. The input devices 615 can allow a user to make manual adjustments, make selections, enter data or other information, or interact in any of a variety of manners with the processor during execution of the instructions.

The subject matter and the operations described herein can be implemented in digital electronic circuitry, or in computer software, firmware, or hardware, including the structures disclosed in this specification and their structural equivalents, or in combinations of one or more of them. The subject matter described in this specification can be implemented at least in part as one or more computer programs, e.g., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing system or apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "data processing system" or "computing device" "mechanism" "module" "intermediary device" "engine" or "component" encompasses apparatuses, devices, and machines for processing data, including by way of example a programmable processor, a computer, a system on a chip, or multiple ones, or combinations, of the foregoing. The apparatuses can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination thereof. The apparatus and execution environment can realize various different computing model infrastructures, such as web services, distributed computing and grid computing infrastructures. The system 100 and components such as the intermediary device 105 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers of the intermediary device 105 that are located at one site or distributed across multiple sites and interconnected by a communication network.

The processes and logic flows described in this specification can be performed by one or more programmable processors executing one or more computer programs (e.g., components of the intermediary device 105) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit). The components of the system 100 can be interconnected by any form or medium of digital data communication, e.g., a communication network. Examples of communication networks include a local area network ("LAN") and a wide area network ("WAN"), an inter-network (e.g., the internet), or peer-to-peer networks (e.g., ad hoc peer-to-peer networks).

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components.

The computing system such as system 100 can include clients and servers. A client and server are generally remote from each other and typically interact through a communication network (e.g., the network 140). The relationship of client and server can arise by virtue of computer programs running on the respective computers and having a client-server relationship to each other. In some implementations, a server transmits data (e.g., a data message) to a client device (e.g., to the client computing device 130 or to the contact center agent computing device 135 for purposes of displaying data to and receiving user input from a user interacting with the client device 130 or an agent interacting with the contact center agent computing device 135). Data generated at the client computing device 130 or at the contact center agent computing device 135 (e.g., a result of the user or agent interaction) can be received from the client computing device 130 or the contact center agent computing device 135 at the server (e.g., received by the intermediary device 105).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the lobby assignment mechanism 110 and other mechanisms of the intermediary device 105 can be a single module, a logic device having one or more processing circuits, or part of one or more servers of the intermediary device 105.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, or claims. Accordingly, neither the reference signs nor their absence have any limiting effect on the scope of any claim elements.

The systems and methods described herein may be embodied in other specific forms without departing from the characteristics thereof. For example, the lobby assignment mechanism 110 can be distributed across multiple servers, or the lobby assignment mechanism 110 and the lobby constructs 120, 125 can be on separate servers or different computing devices of the intermediary device 105, which increases scalability and speed of the intermediary device 105 due to distributed or parallel processing.

Further, identifications of lobby constructs as default and destination are naming conventions. A lobby construct can operate as a default lobby construct in some instances (e.g., where it is the only lobby construct known to the intermediary device) and a destination lobby construct in other instances (e.g., where it is designated as a final destination for data messages of a particular subject matter). The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

What is claimed is:
1. An intermediary device to route data messages in a contact center environment, comprising:
an intermediary device disposed in a data communication path between an electronic communications network and a client computing device, the intermediary device including at least one of a lobby assignment mechanism, a session storage unit, a default lobby construct, and a destination lobby construct, the default lobby construct and the destination lobby construct each constructed to include a plurality of data messages for sessions between contact center agent computing devices and client computing devices;

the intermediary device disposed to receive, via the electronic communications network, a first data message, the first data message having a characteristic;

the lobby assignment mechanism to assign the first data message to the default lobby construct;

the lobby assignment mechanism to obtain, from a contact center agent computing device, an indication of transfer of the first data message to the destination lobby construct that is a different lobby construct than the default lobby construct, the indication of the transfer identifying the first data message;

the lobby assignment mechanism to link, responsive to the indication of the transfer of the first data message to the destination lobby construct, the first data message with the destination lobby construct based on the characteristic of the first data message;

the intermediary device disposed to receive, via the electronic communications network, a second data message having a characteristic;

the intermediary device to identify a correlation between the first data message and the second data message based on the characteristic of the first data message and the characteristic of the second data message; and the lobby assignment mechanism to bypass the default lobby construct to assign the second data message to the destination lobby construct based on the identification of the correlation between the second data message and the first data message assigned to destination lobby construct.

2. The system of claim 1, comprising:
subsequent to assignment of the first data message to the default lobby construct, the intermediary device to allow the contact center agent computing device to access to the first data message in the default lobby construct.

3. The system of claim 1, wherein the contact center agent computing device is a first contact center agent computing device, comprising:
the lobby assignment mechanism to receive from a second contact center agent computing device, an indication that the destination lobby construct is a correct lobby construct for the first data message.

4. The system of claim 1, wherein the contact center agent computing device is a first contact center agent computing device, comprising:
the intermediary device disposed to receive, via the electronic communications network, a third data message;
the lobby assignment mechanism to assign the third data message to the default lobby construct; and
the lobby assignment mechanism to obtain, from one of the first contact center agent computing device and a second contact center agent computing device, an indication that the default lobby construct is a correct lobby construct for the third data message.

5. The system of claim 4, comprising:
the lobby assignment mechanism to link, responsive to the indication that the default lobby construct is the correct lobby construct for the third data message, the third data message with the default lobby construct.

6. The system of claim 1, comprising:
the lobby assignment mechanism to obtain, from the contact center agent computing device, an indication of incorrect assignment of the first data message to the default lobby construct.

7. The system of claim 1, comprising:
the lobby assignment mechanism to provide an indication of the data message in the default lobby construct to the contact center agent computing device.

8. The system of claim 1, comprising:
the lobby assignment mechanism to affirmatively provide an indication of the data message in the default lobby construct to the contact center agent computing device without receipt from the contact center agent computing device of a prior query for the indication of the data message.

9. The system of claim 1, comprising:
the intermediary device to determine, based on the characteristic of the first data message, a tuple corresponding to the first data message; and
the intermediary device to determine, based on the characteristic of the second data message, a tuple corresponding to the second data message.

10. The system of claim 9, comprising:
the lobby assignment mechanism to assign the second data message to the destination lobby construct based on the tuple corresponding to the first data message and the tuple corresponding to the second data message.

11. The system of claim 9, comprising:
the intermediary device to identify the correlation between the first data message and the second data message based on the tuple corresponding to the first data message and the tuple corresponding to the second data message.

12. The system of claim 1, wherein the contact center agent computing device transfers the first data message from the default lobby construct to the destination lobby construct.

13. The system of claim 1, wherein the first data message is routed to an intermediary lobby construct subsequent to assignment of the first data message to the default lobby construct and prior to assignment to the destination lobby construct.

14. The system of claim 1, comprising a live interaction component of the contact center agent computing device to:
access the first data message in the default lobby construct; and
transfer the first data message to the destination lobby construct.

15. The system of claim 1, comprising:
the lobby assignment mechanism to remove the first data message from the default lobby construct.

16. The system of claim 1, wherein the session storage unit includes the default lobby construct and the destination lobby construct.

17. The system of claim 1, wherein the intermediary device includes a plurality of computing devices, comprising:
a first computing device of the plurality of computing devices that includes the lobby assignment mechanism; and
a second computing device of the plurality of computing devices that includes the default lobby construct.

18. A method of data message routing in a contact center environment, comprising:
providing an intermediary device to dispose in a data communication path between an electronic communications network and a client computing device, the intermediary device including at least one of a lobby assignment mechanism, a session storage unit, a default lobby construct, and a destination lobby construct, the default lobby construct and the destination lobby construct each configured to hold a plurality of data messages for sessions between contact center agent computing devices and client computing devices;

receiving, by the intermediary device, via the electronic communications network, a first data message, the first data message having a characteristic;

assigning, by the lobby assignment mechanism, the first data message to the default lobby construct;

obtaining, by the lobby assignment mechanism, from a contact center agent computing device, an indication of a transfer of the first data message to the destination lobby construct that is a different lobby construct than the default lobby construct, the indication of the transfer identifying the first data message;

linking, by the lobby assignment mechanism, responsive to the indication of the transfer of the first data message to the destination lobby construct, the first data message with the destination lobby construct based on the characteristic of the first data message;

receiving, by the intermediary device, via the electronic communications network, a second data message having a characteristic;

identifying, by the intermediary device, a correlation between the first data message and the second data message based on the characteristic of the first data message and the characteristic of the second data message; and assigning, by the lobby assignment mechanism, and bypassing the default lobby construct, the second data message to the destination lobby construct based on identifying the correlation between the second data message and the first data message assigned to destination lobby construct.

19. The method of claim 18, comprising:

subsequent to assignment of the first data message to the default lobby construct, providing the contact center agent computing device with access to the first data message in the default lobby construct.

20. The method of claim 18, wherein the contact center agent computing device is a first contact center agent computing device, comprising:

receiving, by the lobby assignment mechanism, from a second contact center agent computing device, an indication that the destination lobby construct is a correct lobby construct for the first data message.

* * * * *